United States Patent
Kwatra et al.

(10) Patent No.: US 10,971,168 B2
(45) Date of Patent: Apr. 6, 2021

(54) DYNAMIC COMMUNICATION SESSION FILTERING

(71) Applicant: International Business Machines Corporation, Armonk, NY (US)

(72) Inventors: Shikhar Kwatra, Durham, NC (US); Peeyush Jaiswal, Boca Raton, FL (US); Priyansh Jaiswal, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 91 days.

(21) Appl. No.: 16/281,285

(22) Filed: Feb. 21, 2019

(65) Prior Publication Data
US 2020/0273477 A1 Aug. 27, 2020

(51) Int. Cl.
*G10L 21/0208* (2013.01)
*G10L 15/02* (2006.01)
*G10L 15/26* (2006.01)
*G10L 15/07* (2013.01)
*G06N 20/00* (2019.01)

(52) U.S. Cl.
CPC .......... *G10L 21/0208* (2013.01); *G06N 20/00* (2019.01); *G10L 15/02* (2013.01); *G10L 15/075* (2013.01); *G10L 15/26* (2013.01)

(58) Field of Classification Search
CPC ..... G10L 15/02; G10L 15/26; G10L 21/0208; G10L 21/034; G10L 17/005; G10L 17/22; G10L 25/30; G10L 25/60
USPC ....................... 704/228, 232, 235, 246, 270.1
See application file for complete search history.

(56) References Cited

U.S. PATENT DOCUMENTS

| | | | | |
|---|---|---|---|---|
| 6,178,400 B1* | 1/2001 | Eslambolchi | ....... | G10L 21/0364 704/224 |
| 6,327,346 B1* | 12/2001 | Infosino | ............ | H04M 3/42229 379/201.1 |
| 6,850,609 B1 | 2/2005 | Schrage | | |
| 7,236,580 B1 | 6/2007 | Sarkar et al. | | |
| 7,843,486 B1 | 11/2010 | Blair et al. | | |
| 9,113,032 B1* | 8/2015 | Vander Mey | ............ | H04N 7/15 |
| 9,191,218 B1* | 11/2015 | Rehder | .................. | H04L 67/22 |

(Continued)

OTHER PUBLICATIONS

Anonymous, "Method to Provide Situational Priority to Participants in a Conferenc." IP.com Disclosure No. IPCOM000225960D, Publication Date: Mar. 15, 2013, 3 pgs.

(Continued)

*Primary Examiner* — Jakieda R Jackson
(74) *Attorney, Agent, or Firm* — Peter K. Suchecki

(57) ABSTRACT

Provided is a system, method, and computer program product for filtering spoken content in a preferred format to a plurality of users within a communication session A processor may detect spoken content from a first user and a second user of a plurality of users within a communication session over a network. Speech features may be extracted from the detected spoken content. The first user and second user may be identified based on the extracted speech features. The spoken content of the first user and the second user may be filtered according to preferences determined from profiles of the plurality of users. The spoken content of the first user and the second user may be transmitted to the plurality of users in a preferred format based on preferences from the profiles.

17 Claims, 9 Drawing Sheets

(56) References Cited

U.S. PATENT DOCUMENTS

| | | | | |
|---|---|---|---|---|
| 9,565,231 | B1* | 2/2017 | Naim | H04L 65/80 |
| 10,121,488 | B1* | 11/2018 | Drews | H04M 3/2236 |
| 10,382,722 | B1* | 8/2019 | Peters | G06K 9/00718 |
| 10,594,757 | B1* | 3/2020 | Shevchenko | G06F 3/048 |
| 2002/0034280 | A1* | 3/2002 | Infosino | H04M 3/42229 |
| | | | | 379/88.02 |
| 2002/0161579 | A1* | 10/2002 | Saindon | G06F 40/58 |
| | | | | 704/235 |
| 2003/0050777 | A1 | 3/2003 | Walker, Jr. | |
| 2003/0212680 | A1* | 11/2003 | Bates | G06Q 10/109 |
| 2007/0192103 | A1* | 8/2007 | Sato | G10L 25/78 |
| | | | | 704/253 |
| 2009/0168984 | A1 | 7/2009 | Kreiner et al. | |
| 2009/0204399 | A1* | 8/2009 | Akamine | G10L 15/1822 |
| | | | | 704/235 |
| 2009/0220064 | A1* | 9/2009 | Gorti | H04M 3/568 |
| | | | | 379/202.01 |
| 2009/0326939 | A1 | 12/2009 | Toner et al. | |
| 2010/0250249 | A1* | 9/2010 | Fujino | H04N 7/147 |
| | | | | 704/235 |
| 2010/0280828 | A1* | 11/2010 | Fein | G10L 15/1822 |
| | | | | 704/246 |
| 2012/0166188 | A1* | 6/2012 | Chakra | G10L 21/0208 |
| | | | | 704/226 |
| 2013/0051543 | A1* | 2/2013 | McDysan | H04M 3/568 |
| | | | | 379/202.01 |
| 2014/0184905 | A1* | 7/2014 | Mountain | H04N 21/4884 |
| | | | | 348/384.1 |
| 2014/0187210 | A1* | 7/2014 | Chang | H04W 4/16 |
| | | | | 455/414.1 |
| 2014/0379343 | A1* | 12/2014 | Karimi-Cherkandi | |
| | | | | G10L 21/02 |
| | | | | 704/246 |
| 2015/0111615 | A1* | 4/2015 | Chu | H04M 3/4936 |
| | | | | 455/563 |
| 2015/0120293 | A1* | 4/2015 | Wohlert | G10L 21/02 |
| | | | | 704/235 |
| 2015/0179186 | A1* | 6/2015 | Swierk | G06F 3/165 |
| | | | | 704/276 |
| 2015/0287421 | A1* | 10/2015 | Benway | H04R 1/1083 |
| | | | | 704/226 |
| 2016/0055859 | A1* | 2/2016 | Finlow-Bates | G10L 21/0202 |
| | | | | 704/225 |
| 2016/0117624 | A1* | 4/2016 | Flores | H04L 67/306 |
| | | | | 705/7.39 |
| 2016/0125876 | A1* | 5/2016 | Schroeter | G10L 15/20 |
| | | | | 704/226 |
| 2016/0227165 | A1* | 8/2016 | Moorjani | H04L 12/1822 |
| 2016/0261825 | A1* | 9/2016 | Chougle | H04N 7/147 |
| 2017/0061389 | A1* | 3/2017 | Naughton | G06Q 10/1095 |
| 2017/0278513 | A1* | 9/2017 | Li | G10L 15/20 |
| 2018/0014107 | A1* | 1/2018 | Razouane | G10L 21/02 |
| 2018/0090148 | A1 | 3/2018 | Jaiswal et al. | |
| 2018/0129651 | A1* | 5/2018 | Latvala | G06F 40/40 |
| 2018/0189026 | A1* | 7/2018 | Robbins | G06F 3/165 |
| 2018/0192003 | A1* | 7/2018 | Gero | H04L 65/80 |
| 2018/0246486 | A1* | 8/2018 | Krasadakis | G06F 21/6245 |
| 2018/0267955 | A1* | 9/2018 | Catalano | G06F 40/242 |
| 2018/0373488 | A1* | 12/2018 | Chisu | H04N 21/23433 |
| 2019/0019067 | A1* | 1/2019 | Dettori | H04N 7/147 |
| 2019/0034791 | A1* | 1/2019 | Busch | G06N 3/105 |
| 2019/0052471 | A1* | 2/2019 | Panattoni | A63F 13/79 |
| 2019/0066710 | A1* | 2/2019 | Bryan | G10L 25/51 |
| 2019/0082276 | A1* | 3/2019 | Crow | H04R 25/505 |
| 2019/0156847 | A1* | 5/2019 | Bryan | G10L 21/028 |
| 2019/0213659 | A1* | 7/2019 | Shannon | G06F 40/274 |
| 2019/0306563 | A1* | 10/2019 | Chen | H04N 21/431 |
| 2019/0363945 | A1* | 11/2019 | Rogynskyy | G06F 16/22 |
| 2019/0371352 | A1* | 12/2019 | Subramanyam | G10L 15/1815 |
| 2020/0053035 | A1* | 2/2020 | Mukherjee | H04L 51/12 |
| 2020/0066264 | A1* | 2/2020 | Kwatra | G10L 15/22 |
| 2020/0106885 | A1* | 4/2020 | Koster | H04L 65/1006 |
| 2020/0110572 | A1* | 4/2020 | Lenke | G10L 21/0208 |

OTHER PUBLICATIONS

Anonymous, "System for Collaborative Efficiency using Automatic Transcription of Conference Calls and Meeting Management." IP.com Disclosure No. IPCOM000242635D, Publication Date: Jul. 31, 2015, 4 pgs.

C. Kozielski, "Online Speaker Recognition for Teleconferencing Systems," Lehrstuhl für Datenverarbeitung, Technische Universität München, Technical Report, Apr. 14, 2014, 67 pgs.

* cited by examiner

DYNAMIC COMMUNICATION SESSION FILTERING

BACKGROUND

The present disclosure relates generally to the field of communications, and more specifically, to dynamic communication session filtering for providing a preferred communication experience during a communication session between a plurality of users.

Filtering background noise while multiple parties are engaged in a communication session is a common practice. Filtering the background noise allows users engaged in the session to clearly hear the other users within the session without being disturbed by unnecessary sounds. Further, muting all or individual users during the communication session is commonly used to filter out unwanted noises not captured by the background filter.

SUMMARY

Embodiments of the present disclosure include a method, computer program product, and dynamic communication session filtering system for providing a preferred communication experience during a communication session between a plurality of users. A processor may detect spoken content from a first user and a second user of a plurality of users within a communication session over a network. Speech features may be extracted from the detected spoken content. The first user and second user may be identified based on the extracted speech features. The spoken content of the first user and the second user may be filtered according to preferences determined from profiles of the plurality of users. The spoken content of the first user and the second user may be transmitted to the plurality of users in a preferred format based on preferences from the profiles.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
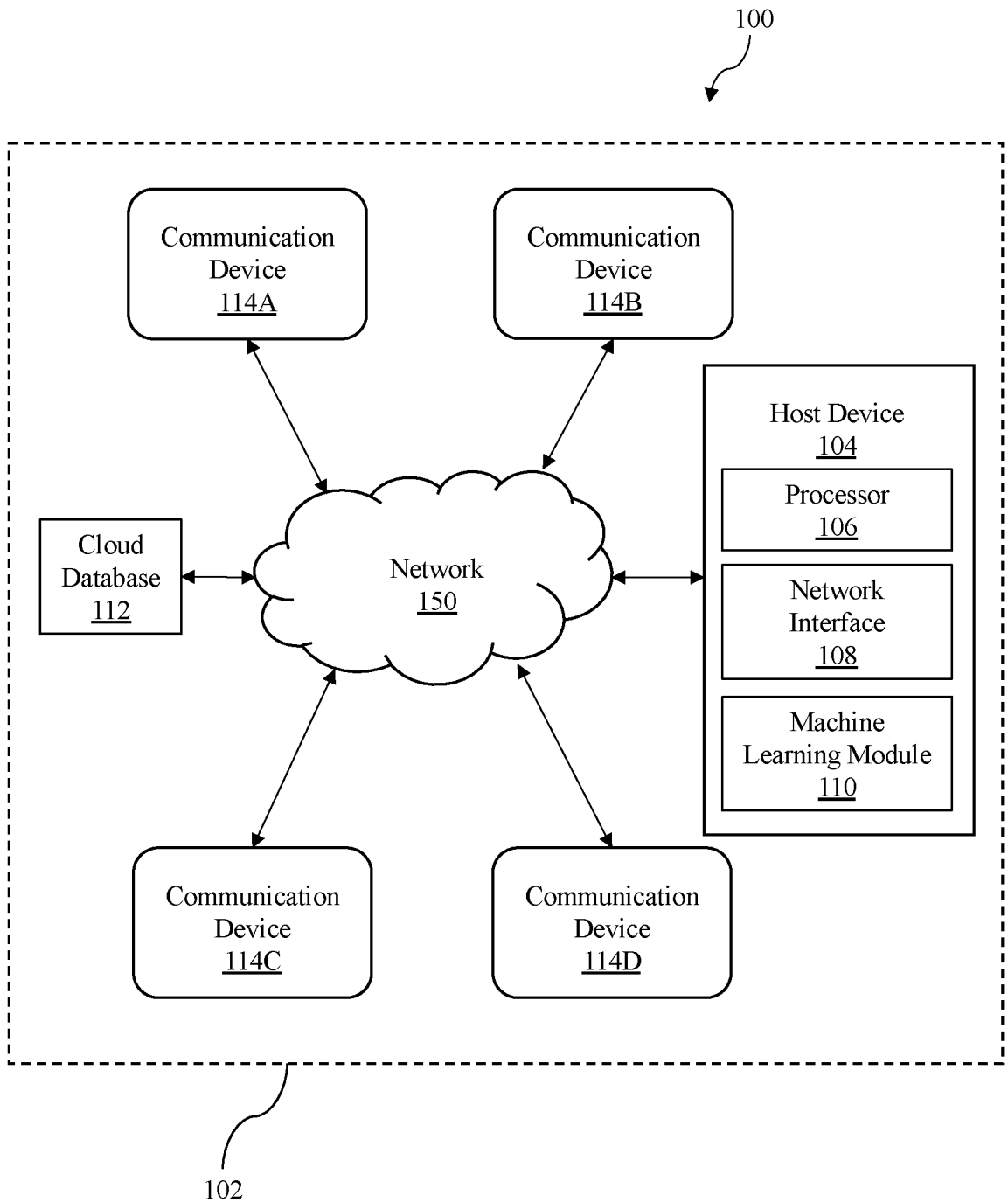
FIG. 1 illustrates a block diagram of a dynamic communication session filtering system, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of communications, and more particularly, to a dynamic communication session filtering system for providing a preferred communication experience during a communication session between a plurality of users. While the present disclosure is not necessarily limited to such applications, various aspects of the disclosure may be appreciated through a discussion of various examples using this context.

Communication sessions between a plurality of users may be conducted in a variety of ways (e.g., video conferencing, teleconferencing, web conferencing, etc.). Users may participate in the communication session using various forms of communication devices, such as smartphones, tablets, telephones, computers, etc. Using various forms of devices to participate in a communication session allows the users to receive content from the session in several formats. Video and/or web conferencing allows users to receive content from communication session in different formats, such as audio, textual, and visual formats.

In many instances, the video and audio feeds may be muted or deactivated for one, some, or all users depending on preferences of the users within the communication session. For example, when only one user's feed is relevant to the discussion (e.g., a single presenter on the session), all other feeds may be selectively deactivated or muted to minimize disturbances to the presenter.

In some communication sessions, one or more users may experience issues with the communication feed. For example, one or more uses may experience significant background noise during the communication session. In another example, one or more users participating in a communication session may experience a low or intermittent audio/video signal from one or more other users during the session. For example, the audio or video feed of a user may phase in and out while speaking during the session, resulting in a choppy feed, such that some or all dialogue of the user may be difficult to comprehend. In many instances, a user experiencing signal issues may be entirely disconnected from the communication session.

As indicated above, various issues can often impact a communication session. Embodiments of the present disclosure provide a method to improve the experience of each user within a communication session by filtering the spoken content of the communication session in a preferred format for each user. In embodiments, the preferred format of the received spoken content may be determined manually by the user or through contextual and historical preferences analyzed by machine learning. Additionally, the present disclosure aims to mitigate any unforeseen disturbances with audio and visual feeds by providing spoken content in an alternative format to prevent any potential losses of content as a result of the disturbance.

In an embodiment, in order to initialize the system, the system may first build a database (e.g., cloud database or cloud repository) containing a digital identifier or user profile in the form of a name and number associated with every user that participates in a communication session. Each user having a unique profile may engage in a training communication session where voice snippets of their spoken content is recorded and stored in conjunction with the profile. The profile and voice snippet of each user can be mapped to each other via a correlation engine. For example, the correlation engine may utilize speech feature extraction and speaker identification (e.g., using Mel Frequency Cepstral Coefficients (MFCC)) to link said speech features to the respective profile of the users engaged in the training communication session. Speech features may be based on various aspects (e.g., power, pitch, vocal tract configuration, etc.) taken from the speech signal of the spoken content.

Once the profile and voice snippets of each user are mapped and stored, the users speaking on a current communication session (e.g., teleconference, videoconference, web conference, telephone call, etc.) can be identified by the system at any point by utilizing the user profile. For example, during a conference call, once each user begins speaking, their speech features are mapped to their respective profile (e.g., using feature matching via Gaussian or a Student-T model mapping).

Using the profile during the communication session allows each user to select a preferred format for receiving or sending spoken content and/or visual content. For example, a first user may be on a video conference call with a second user and a third user, where both the second user and third user are seen by the first user in a split screen. The first user may be receiving a low or intermittent video signal from the third user. As a result, the first user is unable to consistently see and hear what the third user is saying. The first user (or second and third user) may select an option to trigger a request to the cloud database to start recording the voice of the third user and further transcribe the words in caption form to the video conference, thus allowing the third user's spoken content to be communicated to the first user and second user in a textual format. In this way, any spoken content lost from the intermittent video feed of the third user may be captured by the transcribed captions.

In another example, the first user may only be interested in hearing the second user's spoken content, while the third user's spoken content is less important to the first user. In this instance, the first user may send a cloud request to summarize the spoken content of third user, while requesting that the second user's spoken content is fully transcribed and recorded. In some embodiments, the transcribed spoken content of the second user and the summarized spoken content of the third user may be displayed on a graphical user interface (GUI) or it may be stored in the cloud database.

In an embodiment, the system may use cognitive learning to dynamically predict the preferred preferences of each user and apply the appropriate filters to the communication session. The system may use cognitive machine leaning (e.g., neural network mechanism, feedback learning, K means clustering) to determine the content and context of the communication session with respect to the participants and further apply a historical analysis of each user's profile configuration to apply a preferred filter(s) for each user.

With reference now to FIG. 1, shown is a block diagram of a dynamic communication session filtering system 100, in accordance with embodiments of the present disclosure. The dynamic communication session filtering system 100 is presented only by way of example and is not intended to be limiting. The systems and methods disclosed herein may be applicable to a wide variety of different communication devices.

In the illustrative embodiment, the dynamic communication session filtering system 100 includes host device 104 that is communicatively coupled to a plurality of communication devices 114A, 114B, 114C, and 114D (hereinafter collectively referred to as communication device 114) via a communication session 102 over network 150. The host device 104 may be any type of computing device capable of hosting a communication session (e.g., teleconference, video conference, web conference, peer-to-peer communication, etc.). The communication devices 114 may be any type of device configured to participate in a communication session (e.g., telephone, smartphone, tablet, computer, etc.). The communication devices 114 may participate in the communication session in audio formats, textual formats, visual formats, or any combination thereof. In some embodiments, the host device 104 and the communication devices 114 may be any type of computer system and may be substantially similar to computer system 1101 of FIG. 7.

In the illustrative embodiment, the host device 104 includes a processor 106, network interface 108, and a machine learning module 110. While not shown, each of the communication devices 114 may similarly include one or more processors, network interfaces, and machine learning modules. The network interface 108 may enable the host device 104 to connect to the network 150 to communicate with the communication devices 114 within the communication session. Further it is contemplated that each communication device 114 within the system 100 may further communicate with the other communication devices 114 over the network 150. The host device 104 may also communicate with cloud database 112 over network 150 to store and access data. The machine learning module 110 may comprise various machine learning engines (artificial neural network, correlation engines, parser engine, natural language processing engine, reinforcement feedback learning model, etc.) to analyze data generated from the communication session (and previous communication sessions) to dynamically set preferences for each identified user participating in the current communication session 102.

In some embodiments, the host device 104 may be equipped with a display or monitor. The host device 104 may include optional input devices (e.g., a keyboard, mouse, scanner, or other input devices), and/or any commercially available or customer software (e.g., browser software, communications software, server software, natural language processing software, search engine and/or web crawling software, filter modules for filtering content based upon predefined parameters, etc.).

The network 150 may be any type of communication network (e.g., telecommunications network or cloud computing network). Consistent with various embodiments, a cloud computing environment may include a network-based distributed data processing system that provides one or more cloud computing services. Further, a cloud computing environment may include many computers (e.g., hundreds or thousands of computers or more) disposed within one or more data centers and configured to share resources over the network 150. The network 150 may be substantially similar to, or the same as, network 50 described in FIG. 8 and FIG. 9.

In some embodiments, the network 150 can be implemented using any number of any suitable communications media. For example, the network may be a wide area network (WAN), a local area network (LAN), an internet, or an intranet. In certain embodiments, the various systems may be local to each other, and communicate via any appropriate local communication medium. For example, the host device 104 may communicate with the communication devices 114 using a local area network (LAN), one or more hardwire connections, a wireless link or router, or an intranet. In some embodiments, the various systems may be communicatively coupled using a combination of one or more networks and/or one or more local connections. For example, the host device 104 may communicate with communication device 114A using a wireless telecommunication network, while communication device 114B may be hardwired (e.g., connected with an Ethernet cable) to the host device 104.

The host device 104 and the communication devices 114 may be distant from each other and communicate over network 150. In some embodiments, the host device 104 may be a central hub from which each communication device 114 can establish a communication connection, such as in a client-server networking model. Alternatively, the host device 104 and communications devices 114 may be configured in any other suitable networking relationship (e.g., using any other network topology).

It is noted that FIG. 1 is intended to depict the representative major components of an exemplary dynamic communication session filtering system 100. In some embodiments, however, individual components may have greater or lesser complexity than as represented in FIG. 1, components other than or in addition to those shown in FIG. 1 may be present, and the number, type, and configuration of such components may vary. Likewise, one or more components shown with system 100 may not be present, and the arrangement of components may vary.

For example, while FIG. 1 illustrates an example network architecture of system 100 having a single host device 104 and four communication devices 114, suitable network architectures for implementing embodiments of this disclosure may include any number of host devices and communication devices. The various models, modules, systems, and components illustrated in FIG. 1 may exist, if at all, across a plurality of host devices 104 and communication devices 114.

Figure 2:
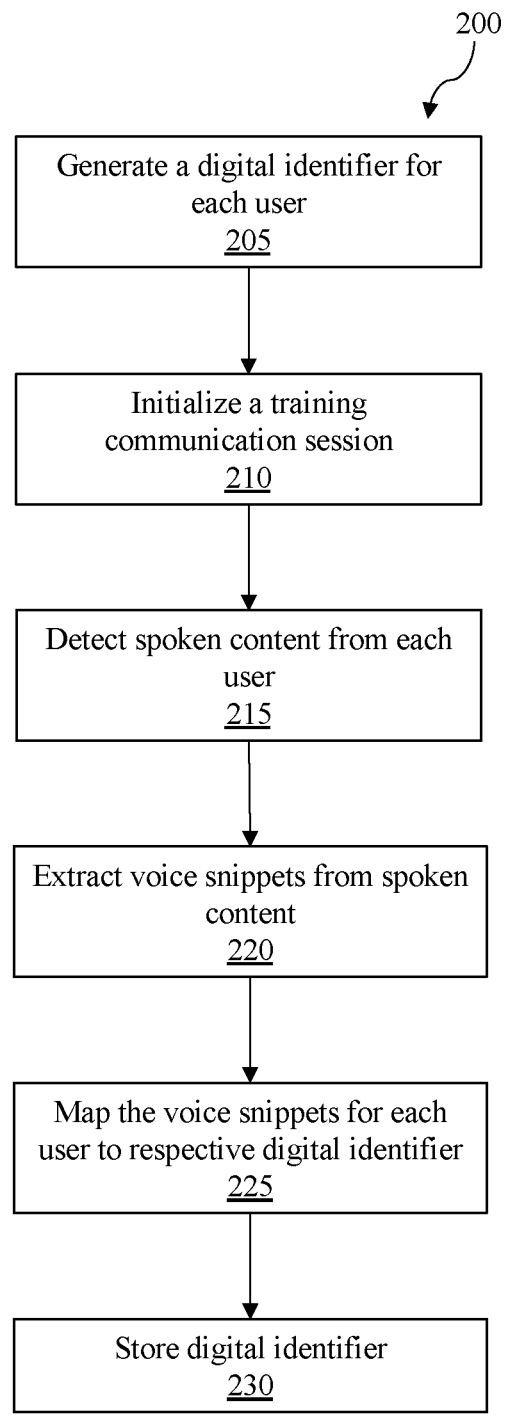
FIG. 2 illustrates a flow diagram of an example process for mapping voice snippets of a user to a digital identifier, in accordance with embodiments of the present disclosure.

Referring now to FIG. 2, shown is a flow diagram of an example process 200 for mapping voice snippets of a user to a user profile, in accordance with embodiments of the present disclosure. The process 200 is initialized in order to train a system to recognize users participating in a communication session by their voices. The process 200 may be performed by processing logic that comprises hardware (e.g., circuitry, dedicated logic, programmable logic, microcode, etc.), software (e.g., instructions run on a processor to perform hardware simulation), firmware, or a combination thereof. In some embodiments, the process 200 is a computer-implemented process. The process 200 may be performed by processor 106 of host device 104 exemplified in FIG. 1. The process 200 may be included in addition to or as a subset of process 300 described in FIG. 3.

In the illustrative embodiment, the process 200 begins by generating a user profile (e.g., digital identifier) for each user of a plurality of users that may participate in a communication session. This is illustrated at step 205. Each user is assigned a unique profile that contains the user's name and other identifying information (e.g., telephone number, IP address, profile information, etc.). The profile may also contain preferences and/or settings for receiving spoken content generated from the communication session in a preferred format (e.g., audio, textual, summarized). Once a profile is generated for each user, the process continues by initializing a training communication session. This is illustrated at step 210. The training communication session may be initiated by the host device, while each user may participate in the training communication session by accessing the session via a communicatively coupled communication device, as described in FIG. 1.

The process 200 continues by detecting spoken content from each user participating in the training communication session. This is illustrated at step 215. The spoken content audio may be received from a microphone on a user's communication device. As each user speaks, the process 200 continues by extracting voice snippets from each user's spoken content. This is illustrated at step 220. Each user is required to speak in order to obtain a voice snippet during the training session. Once a voice snippet is extracted for each user, the process continues by mapping the voice snippet for each user to a respective user profile. This is illustrated at step 225. The mapping of the voice snippet to the profile may be performed by a correlation engine using Mel Frequency Cepstral Coefficients (MFCC). Once the mapping is completed, the profile for each user participating in the training session may be stored in a database (e.g., cloud database, cloud repository). This is illustrated at step 230. Once the profiles are created and stored, they can be accessed by the system to identify users participating in a current communication session, as described in FIG. 3.

Figure 3:
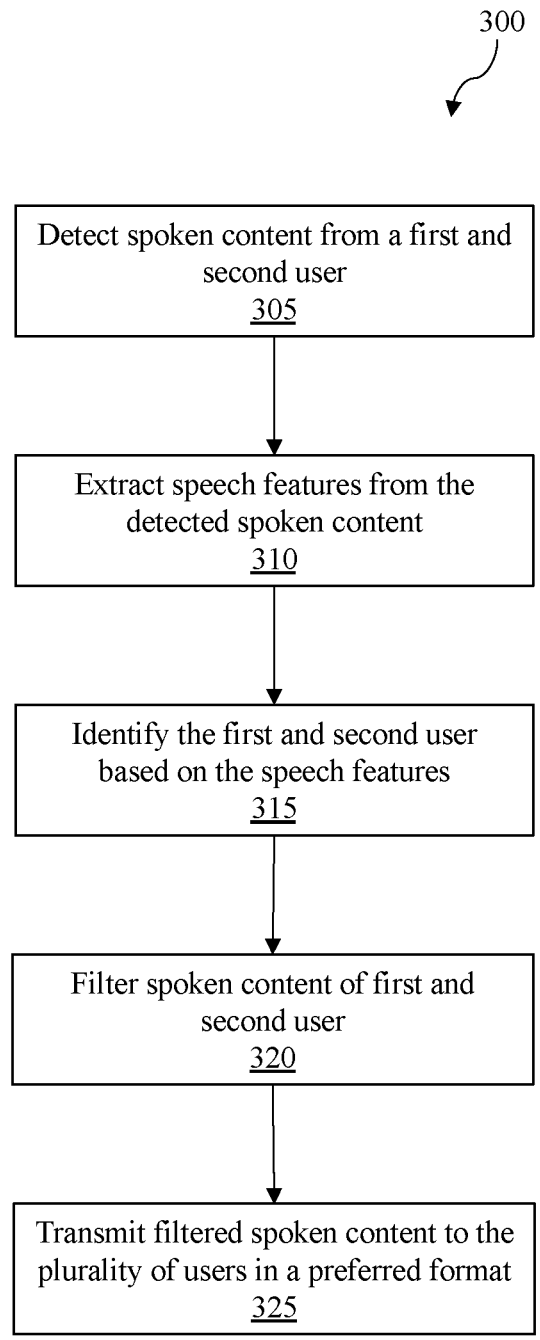
FIG. 3 illustrates a flow diagram of an example process for filtering a communication session according to user preferences, in accordance with embodiments of the present disclosure.

Referring now to FIG. 3, shown is a flow diagram of an example process 300 for filtering a communication session according to user preferences, in accordance with embodiments of the present disclosure. The process 300 may be performed by processing logic that comprises hardware (e.g., circuitry, dedicated logic, programmable logic, microcode, etc.), software (e.g., instructions run on a processor to perform hardware simulation), firmware, or a combination thereof. In some embodiments, the process 300 is a computer-implemented process. The process 300 may be performed by processor 106 of host device 104 exemplified in FIG. 1.

In the illustrative embodiment, the process 300 begins by the processor detecting spoken content of at least a first user and a second user of a plurality of users within a communication session over a network. This is illustrated at step 305. It is contemplated that one or more users of the plurality of users are participating in the communication session by using one or more communication devices (e.g., telephone, smartphone, tablet, computer, etc.). For example, one or more users may be participating in the communication session on the same communication device (e.g., multi-speaker phone in a conference room), or alternatively, all users participating in the communication session may be on different communication devices.

In such an example, the system may determine some users on the communication session by spoken content, while other users may be determined by profile information associated with their communication device (e.g., phone number, IP address, email address). For example, a user that does not speak during the communication session (e.g., user in listening only mode), may be identified through an IP address or phone number associated with their respective communication device and profile. In this way, users that do not speak during the session may still be identified and receive spoken content in a preferred format based on preferences in their user profiles. In some embodiments, one or more of the users may sign in to the communication service using a username and password, and the identities of these users may be determined based on their login credentials.

The process 300 continues by extracting speech features from the detected spoken content. This is illustrated at step 310. Extracting the speech features from the spoken content of each user may be performed by using MFCC. Once speech features are extracted from spoken content of the first and second user, the process 300 continues by identifying each user based on the extracted speech features. This is illustrated at step 315. For example, once the first user starts speaking within a web or teleconference, the system matches the first user's voice to the first user's profile. This allows the system to identify users participating in the communication session by their voice.

Once each speaker on the communication session is identified, the process 300 continues by filtering the spoken content of each identified user according to preferences determined from profiles of the plurality of users. This is illustrated at step 320. Once the spoken content is filtered, the process 300 continues by transmitting the filtered spoken content to the plurality of users in a preferred format. This is illustrated at step 325. For example, a third user on the communication session may prefer to receive the first user's spoken content in an audio format and the second user's spoken content in a summarized format based on the third user's profile preferences.

In an embodiment, the preferred format preferences may be manually selected by the plurality of users via requests triggered by tone, audible, or through configurable graphical user interface (GUI) settings. In an embodiment, the preferred format for spoken content may be determined by machine learning (as described in FIG. 5). In an embodiment, the preferred spoken content format may include, but is not limited to, muting, enhancing, transcribing, recording, storing, and/or summarizing the spoken content of each of the users participating in the communication session simultaneously or on an individual level as detailed in FIG. 4.

Figure 4:
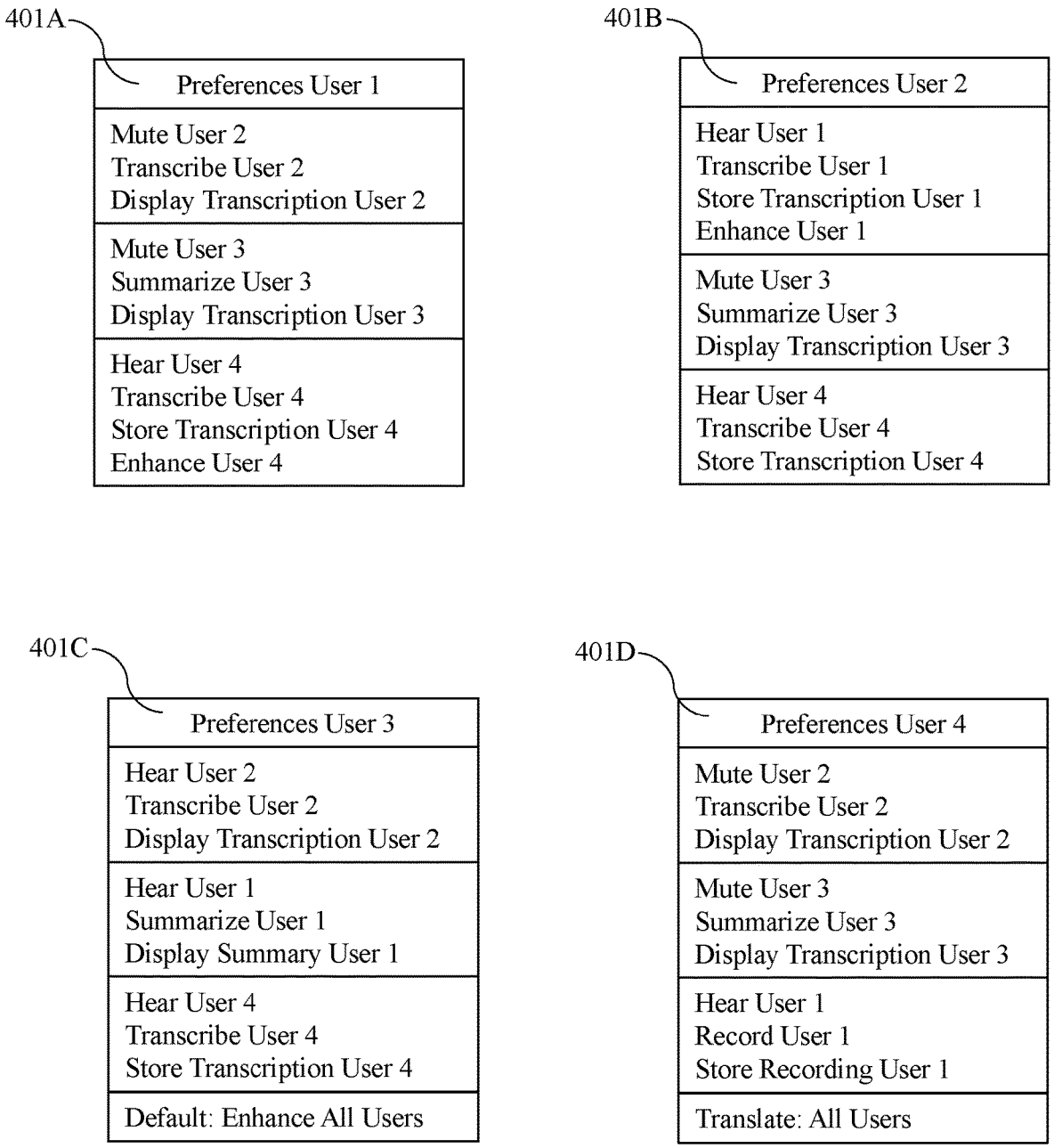
FIG. 4 illustrates example profiles with filtering preferences for each user participating in a communication session, in accordance with embodiments of the present disclosure.

Referring now to FIG. 4, shown are example profiles with filtering preferences for each user participating in a communication session, in accordance with embodiments of the present disclosure. In the illustrative embodiment, four profiles 401A, 401B, 401C, and 401D (collectively referred to as profile 401) are shown for user 1, user 2, user 3, and user 4, respectively. Each profile 401 includes the preferences for the preferred format of spoken content by each respective user within the communication session. Once a user is identified on the communication session using their profile, preferences within the user's profile can be applied to the communication session. It is contemplated that the preference within a user's profile may be changed manually, selected via default, or be based on learned preferences determined by machine learning. Further, the profile content is only used as an example; the layout, content, and configuration settings may be altered.

As shown in FIG. 4, the profile 401A of user 1 has selected preferences to mute the spoken content of user 2, while simultaneously having the spoken content of user 2 transcribed and displayed (e.g., displayed on a user interface). This allows user 1 to read the spoken content of user 2 on a user interface (if desired), while focusing on hearing the spoken content of user 4.

Further, user 1 has selected to mute the spoken content of user 3, while simultaneously having the spoken content of user 3 summarized and displayed. In this example, the spoken content of user 3 may not be as important or relevant to user 1. Therefore, user 1 may only need a summarization of what user 3 discusses during the communication session displayed on the user interface. Alternatively, the spoken content of user 4 may be very relevant to user 1, such that user 1 chooses to hear the spoken content of user 4, enhance the spoken content of user 4, while also selecting the spoken content of user 4 to be transcribed and stored (e.g., stored on a cloud database). Enhancing the spoken content will filter out any unwanted background noise from the spoken content, while allowing the user's voice to be clearly heard.

Some preferences may be set as default preferences if preferred by the user, such as the default preference to enhance all users in profile 401C. For example, default preferences may be configured to enhance all voices of the users speaking during the communication session and further reduce background noise via MFCC voice extraction and enhancement modeling. While other users may only prefer to enhance one voice, such as the presenter on a teleconference. In an embodiment, a user may select to translate the spoken content into another language. For example, user 4 includes a preference to translate all users in the profile 401D. In this way, the spoken content of each of the other users may be translated into a different language in various formats (e.g., transcribed, summarized, audible, etc.). Translation of the spoken content may be useful in a multilingual conference to allow the participants to easily understand each other.

Further, preferences may be altered at any time during the communication session. It is contemplated that the preferences may be altered using a configurable GUI, tone, or audible request. For example, during a communication session a user may decide that spoken content of a user is related to a mutual project. The user may select one option to trigger an application programming interface (API) request to the cloud to start recording the voice of a first user while further transcribing and displaying the conversation of the first user on a user interface.

In another example, a user may configure the user interface or audible/tone format setting to listen only to one of the speakers while spoken content by all others is being summarized, transcribed, and/or stored in another altered fashion. The system allows each user to configure their preference settings, such that they receive spoken content of the other users participating in the communication session in a preferred format.

Figure 5:
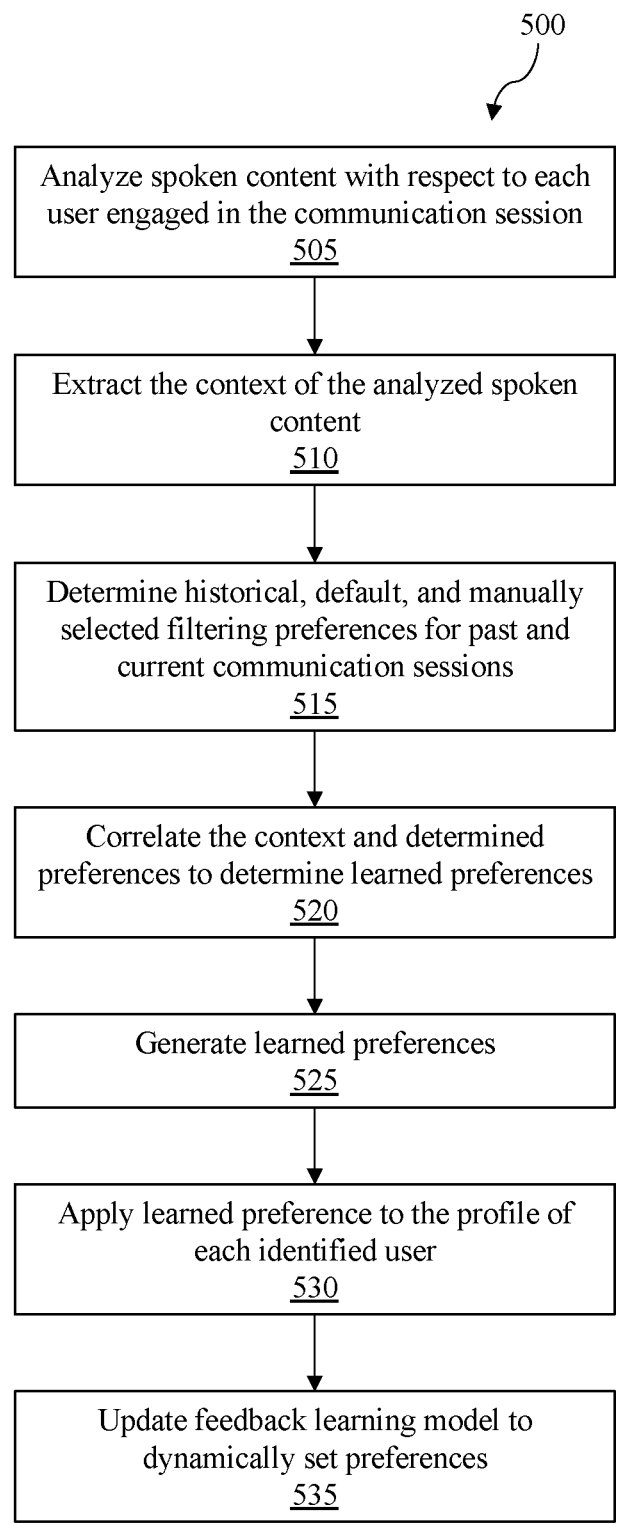
FIG. 5 illustrates a flow diagram of an example process for filtering a communication session by learned preferences, in accordance with embodiments of the present disclosure.

Referring now to FIG. 5, shown is a flow diagram of an example process 500 for filtering a communication session by learned preferences, in accordance with embodiments of the present disclosure. The process 500 may be performed by processing logic that comprises hardware (e.g., circuitry, dedicated logic, programmable logic, microcode, etc.), software (e.g., instructions run on a processor to perform hardware simulation), firmware, or a combination thereof. In some embodiments, the process 500 is a computer-implemented process. The process 500 may be performed by processor 106 of host device 104 exemplified in FIG. 1. The process 500 may be a subset of process 300 exemplified in FIG. 3.

In the illustrative embodiment, the process 500 begins by analyzing the spoken content with respect to the identified users participating in the communication session. This is illustrated at step 505. This process may be performed by utilizing machine learning (e.g., K means clustering) to understand the content of the discussion. Further, the profile information of the identified users may be used to determine the content of the communication session. For example, each identified user's job title and placement in an organizational chart may be used to determine how their spoken content is formatted with regard to other users.

The process 500 continues by extracting the context from the analyzed spoken content. This is illustrated at step 510. The processor may utilize machine learning and/or natural language processing to extract the context and semantics of the analyzed spoken content. In some embodiments, a parser engine may be used to parse the spoken content in combination with context data taken from other applications. For example, the context of the communication session may be extracted from the topic of discussion in combination with meeting times from calendars that feature an agenda and a list of required versus optional participants. These details may be used to rank the importance of the users on a communication. For example, an optional participant on a conference call may be determined to be initially muted or have any spoken content summarized rather than transcribed completely.

The process 500 continues by determining patterns of historical filtering preferences, default filtering preferences, and manually selected preferences for filtering spoken content by each identified user in current and previous communication settings. This is illustrated in step 515. The pattern and sequencing of historical filtering preferences may be tracked and analyzed through machine learning (e.g., Long Short-Term Memory (LSTM) algorithms). Each profile associated with a user may include data showing historical filtering preferences with respect to other users in combination with context of previous communication sessions. For example, a first user may prefer to have spoken content of a second user muted and summarized when discussing project A. However, the first user may prefer to hear the spoken content of the second user while further having the content recorded and transcribed completely when discussing project B because the first user may be working on project B. This sequence and historical preference may be analyzed and considered when determining learned user preferences.

The process 500 continues by correlating the extracted context of the analyzed spoken content and the determined patterns for filtering preferences to generate learned filtering preferences. This is illustrated in step 520. Once the context and patterns are correlated, the process continues by generating learned preferences. This is illustrated in step 525. The learned preferences can then be applied to the profile for each identified user to filter the spoken content from the communication session in a preferred format. This is illustrated in step 530. For example, an identified user might have a pattern of always muting and transcribing the content of a first user because of high background noise, while requesting that a second user is heard, recorded, and transcribed. Utilizing machine learning to analyze the context of the session and patterns of the identified user, these preferences will automatically be chosen for the identified user for filtering the first and second user.

The process 500 continues by updating a feedback learning model to dynamically set the preferences based on the learned preferences from the current communication session. This is illustrated at step 535. The feedback learning model continuously updates the learned preferences by adapting the model according to newly chosen filtering patterns and preferences. For example, in a current communication session, an identified user may request that a video feed always have captions included on the feed. The feedback learning model would dynamically update the learning model based on the user's preference and context of the communication session and apply it to future communication sessions.

Figure 6:
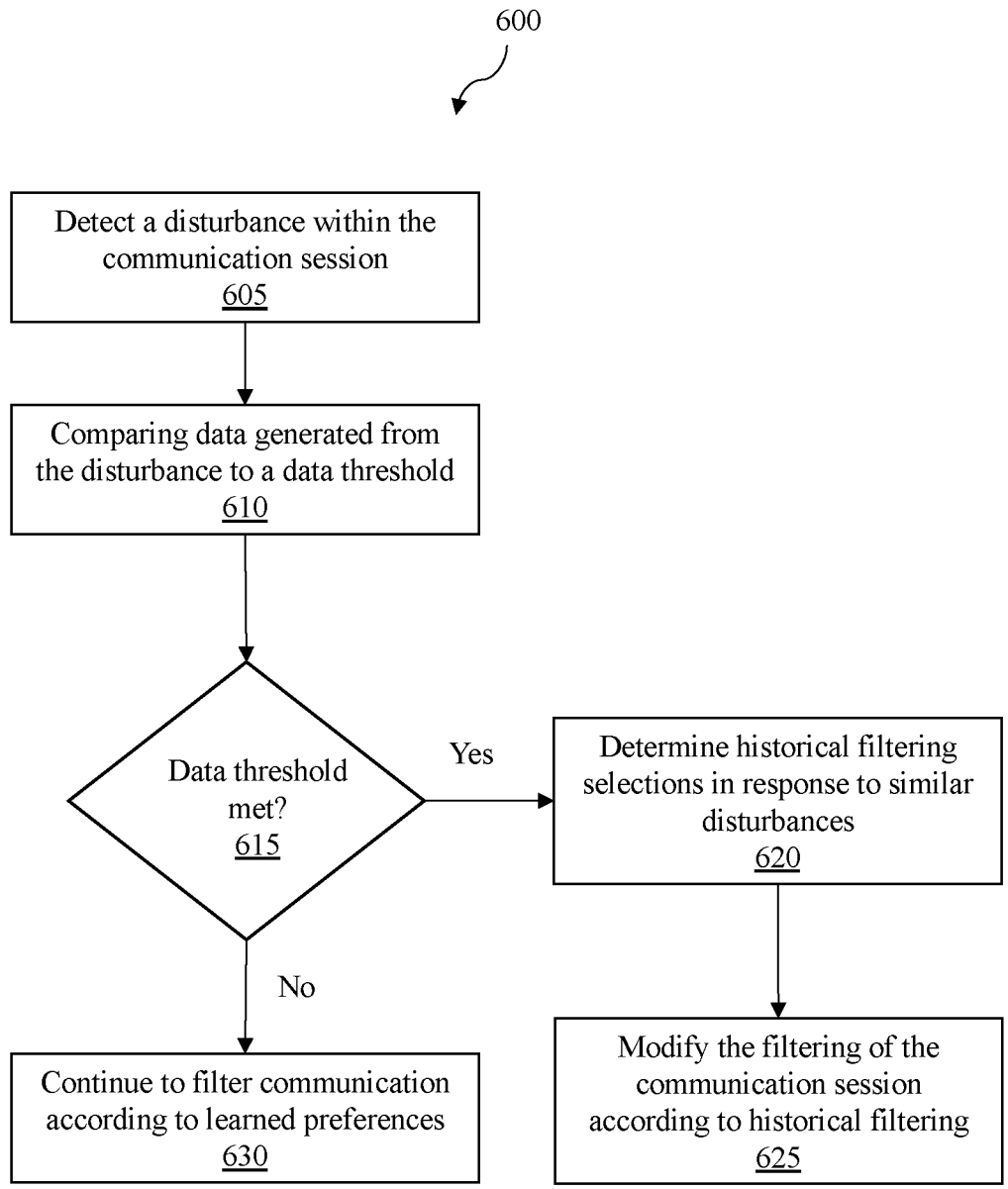
FIG. 6 illustrates a flow diagram of an example process for detecting a disturbance during a communication session, in accordance with embodiments of the present disclosure.

Referring now to FIG. 6, shown is a flow diagram of an example process 600 for detecting a disturbance during a communication session, in accordance with embodiments of the present disclosure. The process 600 may be performed by processing logic that comprises hardware (e.g., circuitry, dedicated logic, programmable logic, microcode, etc.), software (e.g., instructions run on a processor to perform hardware simulation), firmware, or a combination thereof. In some embodiments, the process 600 is a computer-implemented process. The process 600 may be performed by processor 106 of host device 104 exemplified in FIG. 1. The process 600 may be a subset of process 300 exemplified in FIG. 3 and/or a subset of process 500 exemplified in FIG. 5.

The process 600 begins by detecting a disturbance from one or more communication devices within a communication session. This is illustrated at step 605. The disturbance may be any type of disturbance that may interrupt the communication session (e.g., low or intermittent audio/video signal, significant background noise, etc.). The process continues by comparing data generated from the disturbance to a data threshold. This is illustrated at step 610 and 615. For example, data from a low or intermittent audio signal may be compared to a minimum audio data signal threshold. If the data threshold is met, the process continues by determining historical filtering selection chosen in response to a similar disturbance in previous communication sessions. This is illustrated in step 620. For example, if a low audio signal meets the minimum data threshold, the processor will determine from historical patterns that the spoken content coming from communication device with the low audio signal should automatically be transcribed and displayed visually. In this way, any spoken content that may not be heard on the receiving end may be transcribed from the sender's side and read by the other participants in the session.

Once a historical filtering selection is determined, the process continues by modifying the filtering of the current communication session according to the historical filtering selection. This is illustrated at step 625. Depending on the disturbance, the processor will determine the appropriate filter for filtering the content. For example, if the disturbance is a low or intermittent video feed, the processor will determine from previous patterns that the spoken content coming from the video feed should be transcribed and captioned on the feed. In another example, if the disturbance is significant background noise, the processor may determine that the audio feed from the communication device should be muted.

If the data threshold is not met at step 615, the process 600 continues filtering the communication session according to chosen or learned preferences. This is illustrated at step 630. For example, a slight increase in background noise coming from a communication device may not meet a maximum threshold for background noise. Therefore, the processor would not mute the communication device within the session. This prevents the processor from muting the device as a result of a slight disturbance (e.g., another user talking in the background on the session, the sound of a user typing, etc.). It is contemplated that the thresholds for the disturbances may be adjusted based on historical and learned preferences.

Figure 7:
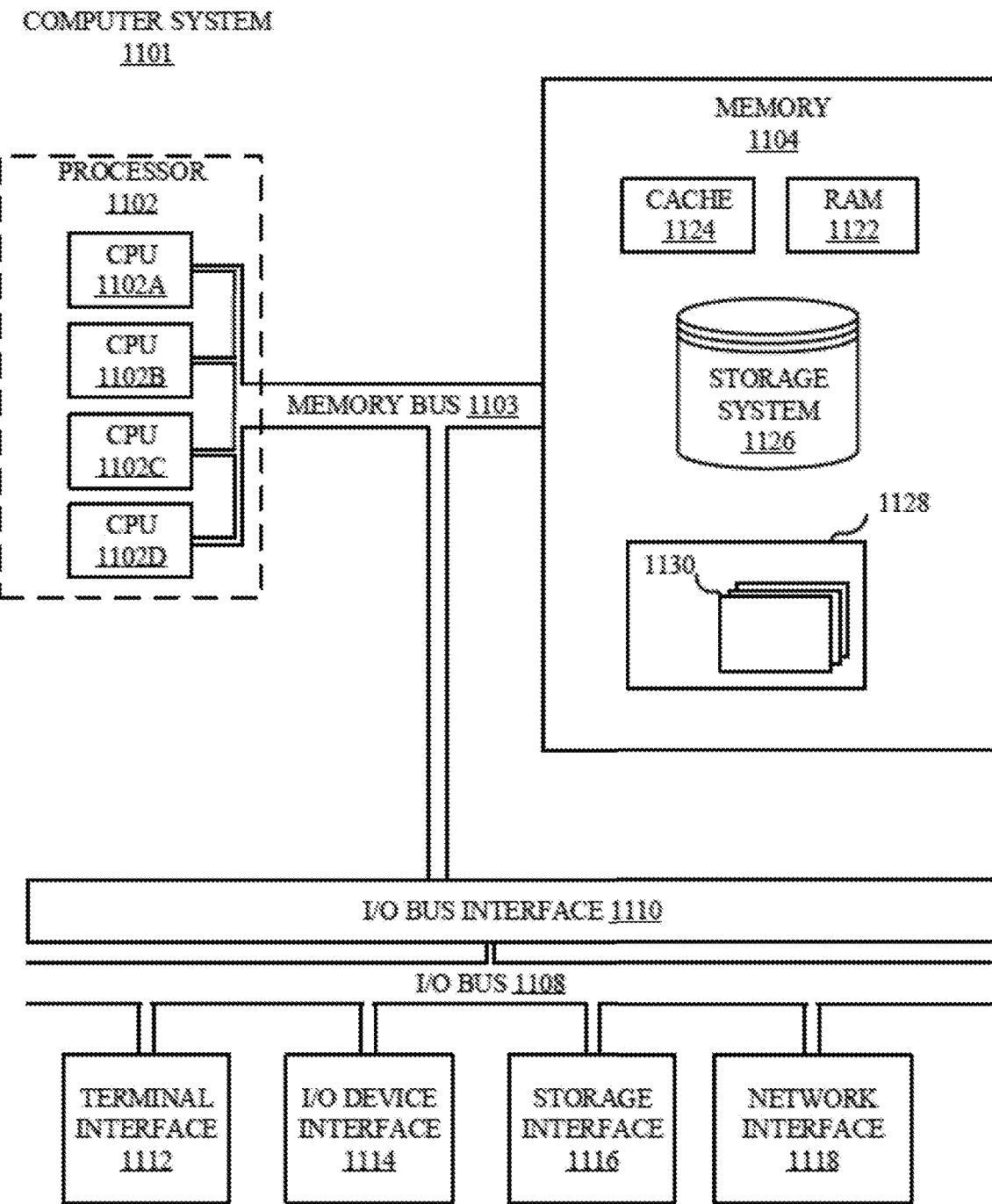
FIG. 7 illustrates a high-level block diagram of an example computer system that may be used in implementing one or more of the methods, tools, and modules, and any related functions, described herein, in accordance with embodiments of the present disclosure.

Referring now to FIG. 7, shown is a high-level block diagram of an example computer system 1101 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 1101 may comprise one or more CPUs 1102, a memory subsystem 1104, a terminal interface 1112, a storage interface 1116, an I/O (Input/Output) device interface 1114, and a network interface 1118, all of which may be communicatively coupled, directly or indirectly, for inter-component communication via a memory bus 1103, an I/O bus 1108, and an I/O bus interface unit 1110.

The computer system 1101 may contain one or more general-purpose programmable central processing units (CPUs) 1102A, 1102B, 1102C, and 1102D, herein generically referred to as the CPU 1102. In some embodiments, the computer system 1101 may contain multiple processors typical of a relatively large system; however, in other embodiments the computer system 1101 may alternatively be a single CPU system. Each CPU 1102 may execute instructions stored in the memory subsystem 1104 and may include one or more levels of on-board cache. In some embodiments, a processor can include at least one or more of, a memory controller, and/or storage controller. In some embodiments, the CPU can execute the processes included herein (e.g., process 200, 300, 500 and 600).

System memory 1104 may include computer system readable media in the form of volatile memory, such as random access memory (RAM) 1122 or cache memory 1124. Computer system 1101 may further include other removable/non-removable, volatile/non-volatile computer system data storage media. By way of example only, storage system 1126 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 1104 can include flash memory, e.g., a flash memory stick drive or a flash drive. Memory devices can be connected to memory bus 1103 by one or more data media interfaces. The memory 1104 may include at least one program product having a set (e.g., at least one) of program modules that are configured to carry out the functions of various embodiments.

Although the memory bus 1103 is shown in FIG. 7 as a single bus structure providing a direct communication path among the CPUs 1102, the memory subsystem 1104, and the I/O bus interface 1110, the memory bus 1103 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 1110 and the I/O bus 1108 are shown as single units, the computer system 1101 may, in some embodiments, contain multiple I/O bus interface units 1110, multiple I/O buses 1108, or both. Further, while multiple I/O interface units are shown, which separate the I/O bus 1108 from various communications paths running to the various I/O devices, in other embodiments some or all of the I/O devices may be connected directly to one or more system I/O buses.

In some embodiments, the computer system 1101 may be a multi-user mainframe computer system, a single-user system, or a server computer or similar device that has little or no direct user interface, but receives requests from other computer systems (clients). Further, in some embodiments, the computer system 1101 may be implemented as a desktop computer, portable computer, laptop or notebook computer, tablet computer, pocket computer, telephone, smart phone, network switches or routers, or any other appropriate type of electronic device.

It is noted that FIG. 7 is intended to depict the representative major components of an exemplary computer system 1101. In some embodiments, however, individual components may have greater or lesser complexity than as represented in FIG. 7, components other than or in addition to those shown in FIG. 7 may be present, and the number, type, and configuration of such components may vary.

One or more programs/utilities 1128, each having at least one set of program modules 1130 may be stored in memory 1104. The programs/utilities 1128 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 1128 and/or program modules 1130 generally perform the functions or methodologies of various embodiments.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
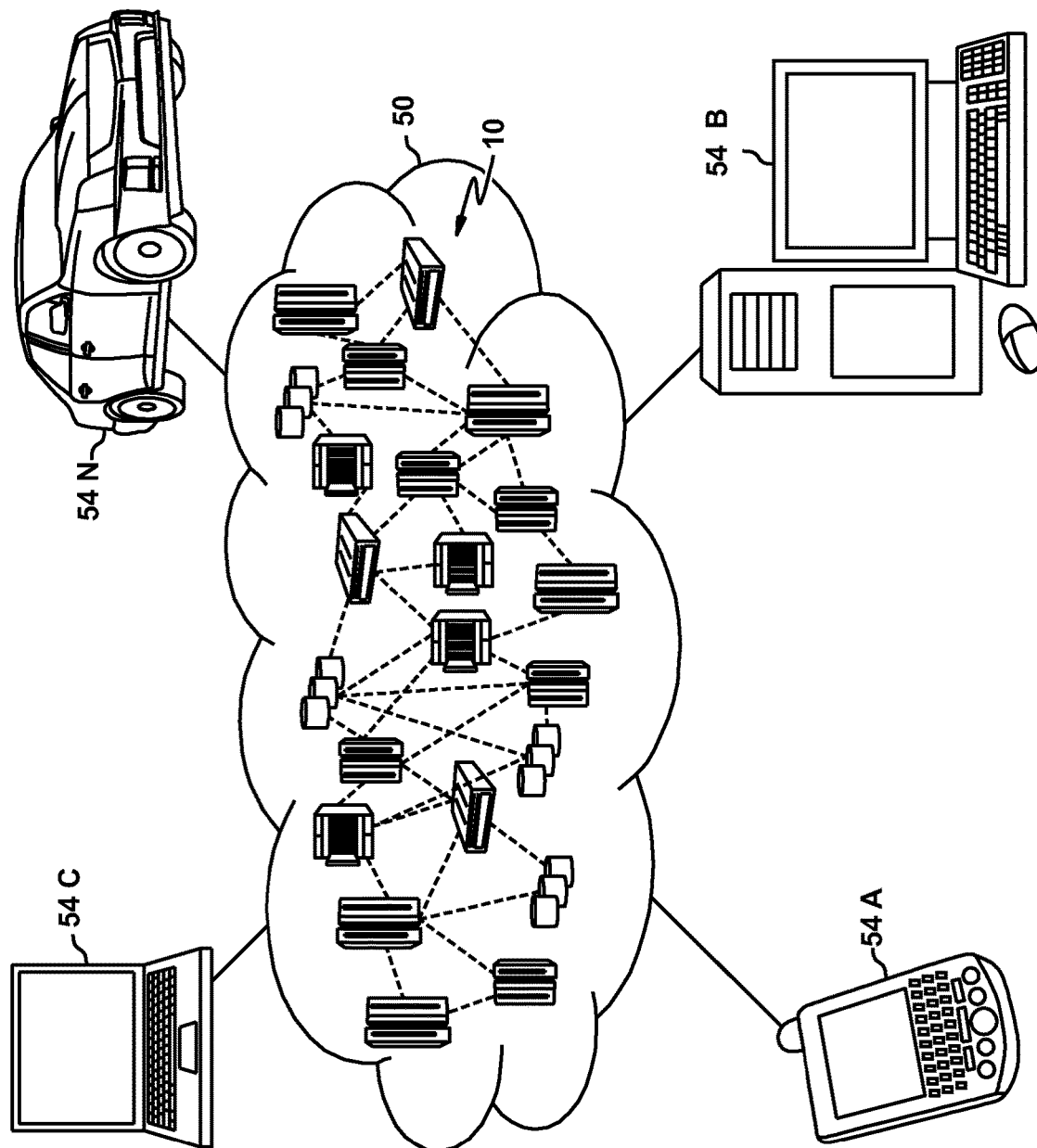
FIG. 8 depicts a cloud computing environment according to an embodiment of the present invention.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
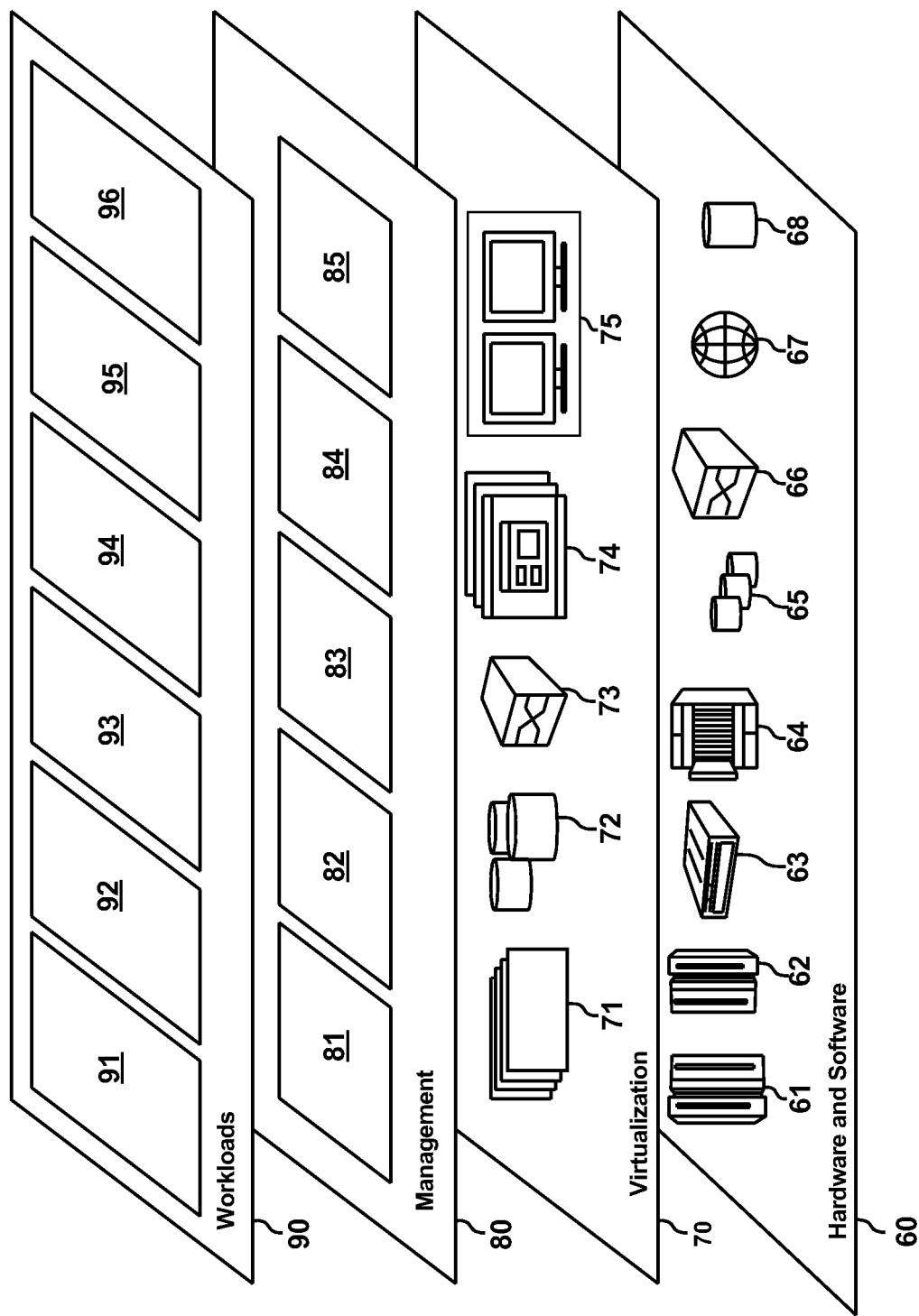
FIG. 9 depicts abstraction model layers according to an embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktops 96.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    detecting, by a processor, spoken content from a first user and a second user of a plurality of users within a communication session over a network;
    extracting, by the processor, speech features from the detected spoken content;
    identifying, by the processor, the first user and the second user based on the extracted speech features;
    filtering, by the processor, the spoken content of the first user and second user according to preferences determined from profiles of the plurality of users;
    transmitting, by the processor, the filtered spoken content of the first user and the second user to the plurality of users in a preferred format based on the preferences from the profiles;
    detecting, by the processor, a disturbance from one or more communication devices used during the communication session, wherein the disturbance is an intermittent video signal that produces low video signal data;
    comparing, by the processor, data generated from the disturbance to a minimum video signal data threshold;
    determining, by the processor and in response to the disturbance meeting the data threshold, patterns of historical filtering selections in response to a similar disturbance; and
    modifying, by the processor and in response to the disturbance matching the similar disturbance, the filtering of the communication session according to the historical filtering selections, wherein the historical filtering selection is transcribing the spoken content coming from the one or more communication devices as captions in conjunction with the video signal.

2. The method of claim 1, further comprising:
    generating, by the processor, a profile for each of the plurality of users;
    initializing, by the processor, a training communication session for the plurality of users;
    receiving, by the processor, spoken content from each user in the training communication session;
    extracting, by the processor, voice snippets from spoken content from each user;
    mapping, by the processor, the voice snippets for each user to a respective profile; and
    storing, by the processor, the profile of each user in storage.

3. The method of claim 1, wherein filtering the spoken content of the first user and second user according to preferences determined from profiles of the plurality of users comprises:
    analyzing, by the processor and utilizing machine learning, the spoken content with respect to identified users participating in the communication session;
    extracting, by the processor and utilizing machine learning, context of the analyzed spoken content;
    determining, by the processor and utilizing machine learning, historical patterns for filtering spoken content by each user;
    correlating, by the processor and utilizing machine learning, the context of the analyzed spoken content and the determined historical patterns;
    generating, by the processor and in response to the correlating, learned filtering preferences; and
    applying, by the processor, the learned preferences to the profile of each user.

4. The method of claim 3, further comprising:
    updating, by the processor, a feedback learning model to dynamically set preferences within the profile of each user based on learned preferences from the communication session.

5. The method of claim 1, wherein the preferred format of spoken content of the first user is transmitted in audio form and the spoken content of the second user is transcribed in textual form.

6. The method of claim 1, wherein the preferred format of spoken content of the first user is transmitted in audio form and the spoken content of the second user is summarized in textual form.

7. The method of claim 1, wherein the profile of each respective user of the plurality of users includes a name and telephone number of the respective user.

8. A computer program product comprising a computer readable storage medium having program instructions embodied therewith, the program instructions executable by a processor to cause the processor to perform a method comprising:
    detecting an intermittent video signal that produces low video signal data from a communication device used during a communication session;
    comparing data generated from the intermittent video signal to a minimum video signal data threshold;
    determining, in response to the data generated from the intermittent video signal meeting the data threshold, patterns of historical filtering selections in response to a previous intermittent video signal; and
    filtering the communication session according to the historical filtering selections by transcribing spoken content coming from the communication device as captions in conjunction with the video signal.

9. The computer program product of claim 8, wherein the patterns of historical filtering selections are determined using machine learning.

10. The computer program product of claim 8, wherein filtering the communication session is further based in part on a ranking of a plurality of users.

11. The computer program product of claim 10, wherein the spoken content is summarized in the captions for a subset of the plurality of users based on the ranking.

12. The computer program product of claim 11, wherein the subset of the plurality of users are determined to be optional users.

13. A system comprising:
    a processor; and
    a computer-readable storage medium communicatively coupled to the processor and storing program instructions which, when executed by the processor, cause the processor to perform a method comprising:
        detecting an intermittent video signal that produces low video signal data from a communication device used during a communication session;
        comparing data generated from the intermittent video signal to a minimum video signal data threshold;
        determining, in response to the data generated from the intermittent video signal meeting the data threshold, patterns of historical filtering selections in response to a previous intermittent video signal; and
        filtering the communication session according to the historical filtering selections by transcribing spoken content coming from the communication device as captions in conjunction with the video signal.

14. The system of claim 13, wherein the patterns of historical filtering selections are determined using machine learning.

15. The system of claim 13, wherein filtering the communication session is further based in part on a ranking of a plurality of users.

16. The system of claim 15, wherein the spoken content is summarized in the captions for a subset of the plurality of users based on the ranking.

17. The system of claim 16, wherein the subset of the plurality of users are determined to be optional users.

* * * * *